(12) United States Patent
Mader et al.

(10) Patent No.: US 10,135,309 B2
(45) Date of Patent: Nov. 20, 2018

(54) ELECTRICAL MACHINE HAVING A FLUX-CONCENTRATING PERMANENT MAGNET ROTOR AND REDUCTION OF THE AXIAL LEAKAGE FLUX

(71) Applicant: SIEMENS AKTIENGESELLSCHAFT, München (DE)

(72) Inventors: Daniel Mader, Bad Neustadt an der Saale (DE); Rolf Vollmer, Gersfeld (DE)

(73) Assignee: Siemens Aktiengesellschaft, München (DE)

( * ) Notice: Subject to any disclaimer, the term of this patent is extended or adjusted under 35 U.S.C. 154(b) by 183 days.

(21) Appl. No.: 14/784,516

(22) PCT Filed: Aug. 27, 2013

(86) PCT No.: PCT/EP2013/067660
§ 371 (c)(1),
(2) Date: Oct. 14, 2015

(87) PCT Pub. No.: WO2014/169974
PCT Pub. Date: Oct. 23, 2014

(65) Prior Publication Data
US 2016/0079815 A1    Mar. 17, 2016

(30) Foreign Application Priority Data
Apr. 17, 2013   (EP) .................... 13164073

(51) Int. Cl.
*H02K 1/27* (2006.01)
*H02K 1/28* (2006.01)
(52) U.S. Cl.
CPC ............. *H02K 1/2773* (2013.01); *H02K 1/28* (2013.01); *H02K 2201/09* (2013.01)

(58) Field of Classification Search
CPC ................... H02K 1/2773; H02K 1/28; H02K 1/27–1/2793
(Continued)

(56) References Cited

U.S. PATENT DOCUMENTS 2,504,825 A * 4/1950 Meyer ............... H02K 15/0012
310/211
5,829,120 A * 11/1998 Uchida ............... H02K 1/2773
29/598
(Continued)

FOREIGN PATENT DOCUMENTS

CN    101083408 A    12/2007
DE       699236 C  * 11/1940   .......... H02K 1/2726
(Continued)

OTHER PUBLICATIONS

Machine Translation, Teichmann Bruno, DE 699236 C, Nov. 1940.*
(Continued)

*Primary Examiner* — Thomas Truong
(74) *Attorney, Agent, or Firm* — Henry M. Feiereisen LLC

(57) ABSTRACT

A rotor having a number of tangentially magnetized permanent magnets tangentially evenly distributed and arranged both in the center region and in the outer regions in the axial direction is disclosed. Flux-guiding elements between the permanent magnets guide the magnetic fields of the permanent magnets radially toward the center region of the stator. The flux-guiding elements comprise a plurality of sheets stacked on one another in the axial direction. The sheets in the outer regions are smaller than the sheets in the center region. The sheets arranged in the outer regions are surrounded on their radially outside end by a retaining apparatus. Form-fitting elements transmit centrifugal forces act-
(Continued)

ing on the sheets arranged in the center region are transmitted to the sheets arranged in the outer regions.

9 Claims, 5 Drawing Sheets

(58) Field of Classification Search
USPC ........ 310/156.31, 156.18, 216.001–216.137, 310/413
IPC ................................................ H02K 1/27,1/28
See application file for complete search history.

(56) References Cited

U.S. PATENT DOCUMENTS

| | | |
|---|---|---|
| 6,483,221 B1 | 11/2002 | Pawellek et al. |
| 6,628,031 B2 | 9/2003 | Vollmer |
| 6,768,238 B2 | 7/2004 | Knauff et al. |
| 6,812,612 B2 | 11/2004 | Schunk et al. |
| 6,858,965 B2 | 2/2005 | Mueller et al. |
| 6,885,187 B2 | 4/2005 | Duenisch et al. |
| 6,943,467 B2 | 9/2005 | Potoradi et al. |
| 7,141,905 B2 | 11/2006 | Vollmer |
| 7,285,883 B2 | 10/2007 | Bott et al. |
| 7,564,158 B2 | 7/2009 | Huth et al. |
| 7,705,507 B2 | 4/2010 | Vollmer |
| 7,709,984 B2 | 5/2010 | Braun et al. |
| 7,732,967 B2 | 6/2010 | Schunk et al. |
| 7,755,315 B2 | 7/2010 | Bott et al. |
| 7,777,373 B2 | 8/2010 | Bott et al. |
| 7,859,160 B2 | 12/2010 | Vollmer |
| 7,915,777 B2 | 3/2011 | Vollmer |
| 7,977,826 B2 | 7/2011 | Vollmer et al. |
| 8,026,640 B2 | 9/2011 | Bott et al. |
| 8,035,371 B2 | 10/2011 | Budde et al. |
| 8,063,517 B2 | 11/2011 | Bott et al. |
| 8,115,360 B2 | 2/2012 | Vollmer |
| 8,134,273 B2 | 3/2012 | Vollmer et al. |
| 8,227,951 B2 | 7/2012 | Grossmann et al. |
| 8,283,815 B2 | 10/2012 | Vollmer |
| 8,378,541 B2 | 2/2013 | Vollmer |
| 8,853,894 B2 | 10/2014 | Vollmer et al. |
| 2003/0011267 A1 | 1/2003 | Vollmer |
| 2003/0094940 A1 | 5/2003 | Duenisch et al. |
| 2003/0173853 A1 | 9/2003 | Knauff et al. |
| 2004/0075359 A1 | 4/2004 | Mueller et al. |
| 2004/0084989 A1 | 5/2004 | Schunk et al. |
| 2004/0155539 A1 | 8/2004 | Potoradi et al. |
| 2004/0261553 A1 | 12/2004 | Bott et al. |
| 2005/0231060 A1 | 10/2005 | Vollmer |
| 2006/0219880 A1 | 10/2006 | Braun et al. |
| 2007/0035193 A1 | 2/2007 | Huth et al. |
| 2007/0040466 A1 | 2/2007 | Vollmer |
| 2007/0114861 A1 | 5/2007 | Bott et al. |
| 2007/0257566 A1 | 11/2007 | Vollmer |
| 2007/0257575 A1 | 11/2007 | Vollmer |
| 2007/0290569 A1 | 12/2007 | Bode |
| 2008/0073985 A1 | 3/2008 | Bott et al. |
| 2008/0164777 A1 | 7/2008 | Braun et al. |
| 2008/0169718 A1 | 7/2008 | Bott et al. |
| 2008/0185931 A1 | 8/2008 | Platen et al. |
| 2008/0197741 A1 | 8/2008 | Schunk et al. |
| 2008/0197742 A1 | 8/2008 | Vollmer |
| 2008/0289440 A1 | 11/2008 | Denk et al. |
| 2008/0315704 A1 | 12/2008 | Vollmer |
| 2009/0009114 A1 | 1/2009 | Schunk et al. |
| 2009/0015080 A1 | 1/2009 | Vollmer et al. |
| 2009/0026867 A1 | 1/2009 | Haruno et al. |
| 2009/0039713 A1 | 2/2009 | Bott et al. |
| 2009/0072634 A1 | 3/2009 | Vollmer |
| 2009/0152959 A1 | 6/2009 | Vollmer |
| 2009/0152976 A1 | 6/2009 | Bott et al. |
| 2009/0160283 A1 | 6/2009 | Bott et al. |
| 2009/0184602 A1 | 7/2009 | Braun et al. |
| 2009/0206686 A1 | 8/2009 | Vollmer |
| 2009/0212644 A1 | 8/2009 | Bott et al. |
| 2009/0218904 A1 | 9/2009 | Vollmer |
| 2009/0251013 A1 | 10/2009 | Vollmer et al. |
| 2009/0295236 A1 | 12/2009 | Bott et al. |
| 2009/0295251 A1 | 12/2009 | Vollmer et al. |
| 2009/0302832 A1 | 12/2009 | Budde et al. |
| 2009/0315424 A1 | 12/2009 | Vollmer |
| 2009/0322174 A1 | 12/2009 | Grossmann et al. |
| 2010/0000830 A1 | 1/2010 | Budde et al. |
| 2010/0013332 A1 | 1/2010 | Vollmer |
| 2010/0013333 A1 | 1/2010 | Vollmer |
| 2010/0013341 A1 | 1/2010 | Vollmer |
| 2010/0052466 A1 | 3/2010 | Vollmer et al. |
| 2010/0133940 A1 | 6/2010 | Grossmann et al. |
| 2010/0231085 A1* | 9/2010 | Ifrim ................... H02K 1/2773 310/216.123 |
| 2010/0264770 A1 | 10/2010 | Braun et al. |
| 2011/0006617 A1 | 1/2011 | Budde et al. |
| 2011/0074242 A1* | 3/2011 | Singhal ................... H02K 1/22 310/216.058 |
| 2012/0025654 A1 | 2/2012 | Bach et al. |
| 2012/0038228 A1 | 2/2012 | Vollmer |
| 2012/0146435 A1 | 6/2012 | Bott et al. |
| 2012/0181880 A1 | 7/2012 | Zhao et al. |
| 2013/0127264 A1 | 5/2013 | Vollmer et al. |
| 2013/0147285 A1 | 6/2013 | Vollmer et al. |
| 2013/0241324 A1 | 9/2013 | Mader et al. |
| 2013/0241335 A1 | 9/2013 | Vollmer |
| 2013/0241338 A1 | 9/2013 | Mader et al. |
| 2013/0249340 A1 | 9/2013 | Potoradi |
| 2014/0015356 A1* | 1/2014 | Chamberlin ............. H02K 1/18 310/64 |
| 2014/0028135 A1 | 1/2014 | Vollmer |
| 2014/0042857 A1 | 2/2014 | Mader et al. |
| 2014/0070655 A1 | 3/2014 | Schneider et al. |
| 2014/0097782 A1 | 4/2014 | Vollmer |
| 2014/0102674 A1* | 4/2014 | Manz ................... H02K 1/2773 165/121 |

FOREIGN PATENT DOCUMENTS

| | | | |
|---|---|---|---|
| DE | 689 06 910 | 11/1993 | |
| DE | 102007012822 A1 * | 5/2008 | ............. H02K 1/278 |
| DE | 10 2012 107 610 | 2/2013 | |
| FR | 2 519 483 | 7/1983 | |
| FR | 2519483 A1 * | 7/1983 | ........... H02K 1/2773 |
| JP | H0236741 A | 2/1990 | |
| JP | 2010081675 A | 4/2010 | |
| JP | 2012186901 A * | 9/2012 | |

OTHER PUBLICATIONS

Machine Translation, Boudrant Antoine, FR 2519483 A1, Jul. 1983.*
Machine Translation, Maruyama, JP 2012186901 A, Sep. 2012.*
USPTO Translation, Teichmann Bruno , DE 699236, Nov. 1940.*
Machine Translation, Taeubner, DE 102007012822 A1, May 2008.*
International Search Report issued by the European Patent Office in International Application PCT/EP2013/067660.

* cited by examiner

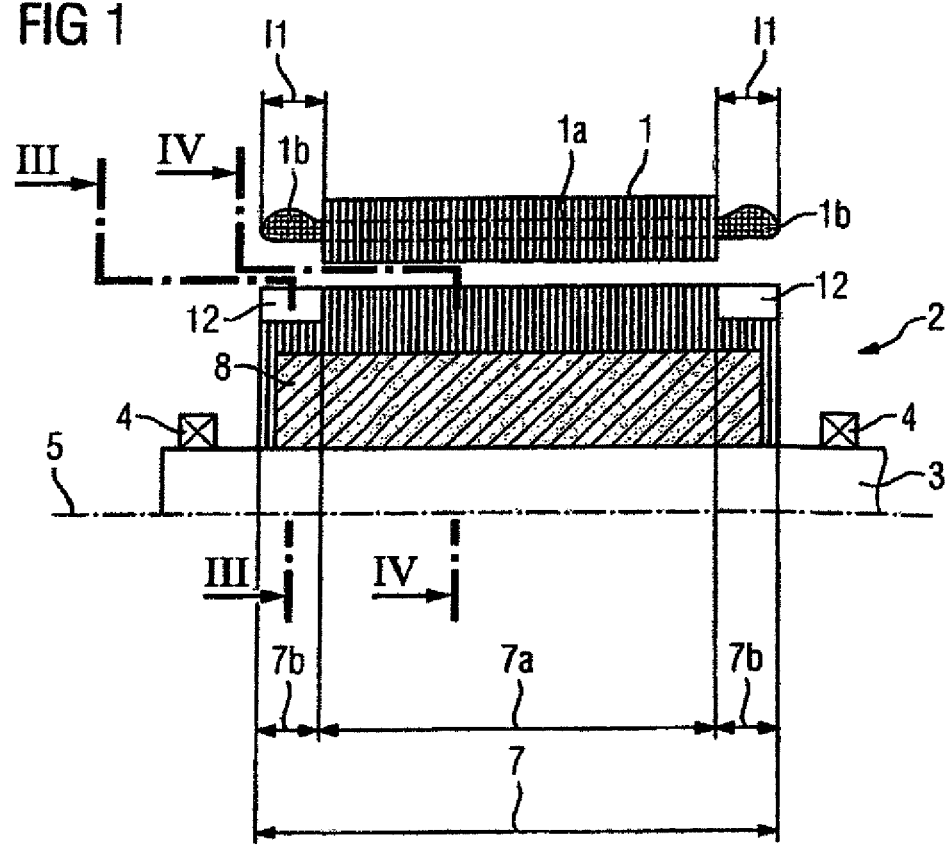

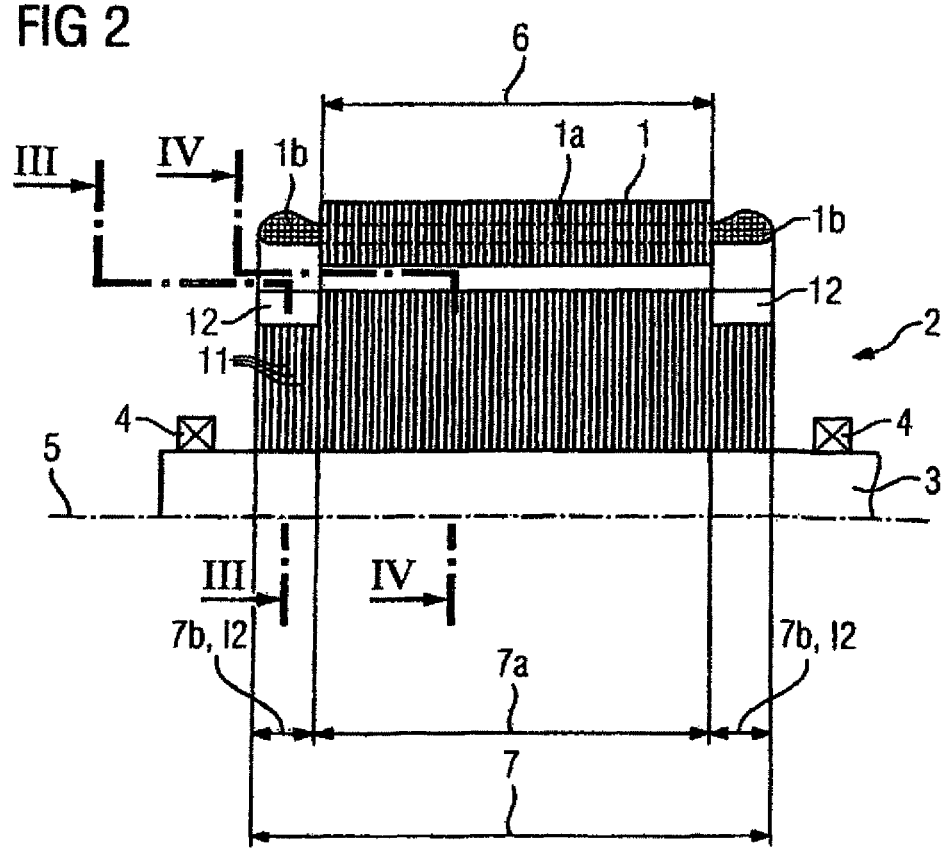

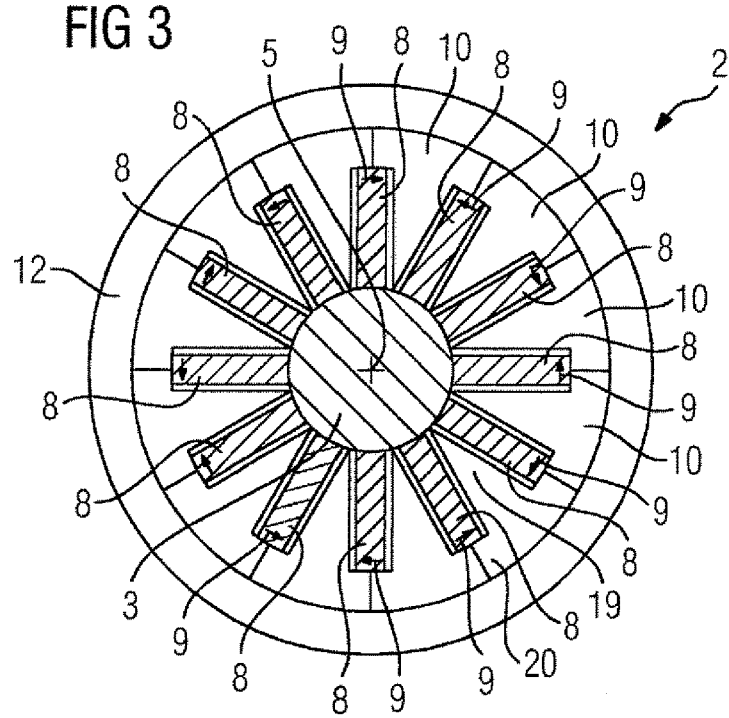
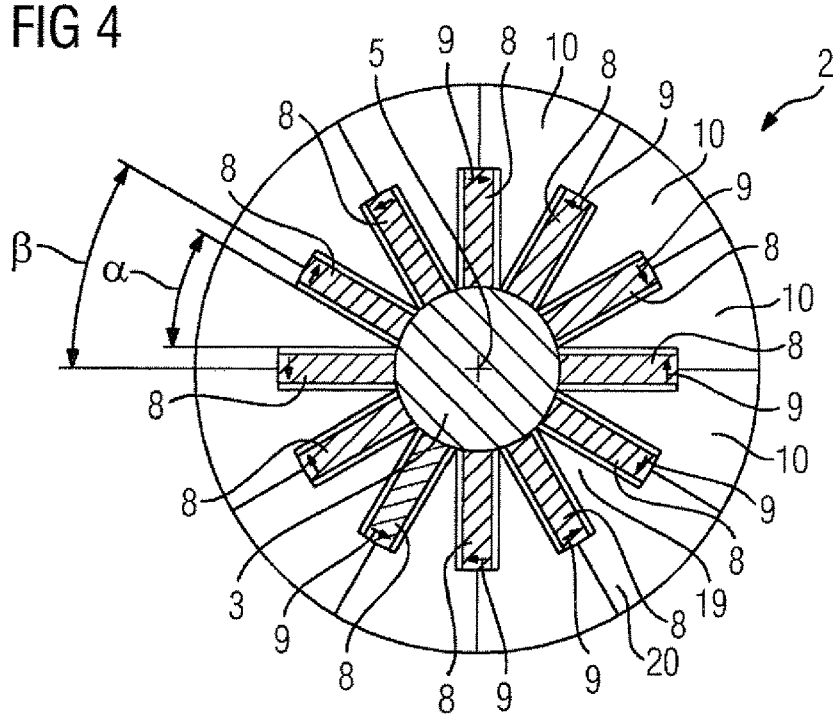

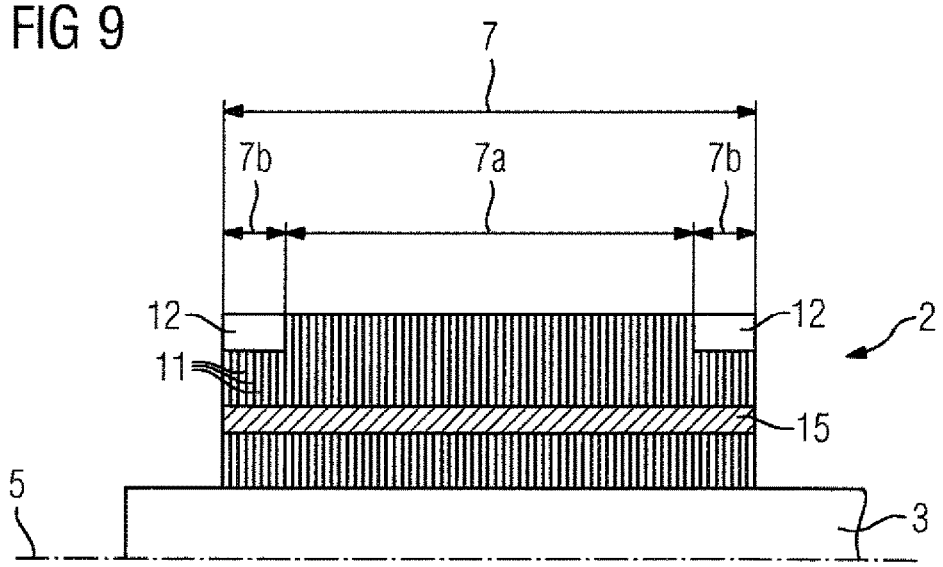

ELECTRICAL MACHINE HAVING A FLUX-CONCENTRATING PERMANENT MAGNET ROTOR AND REDUCTION OF THE AXIAL LEAKAGE FLUX

CROSS-REFERENCES TO RELATED APPLICATIONS

This application is the U.S. National Stage of International Application No. PCT/EP2013/067660, filed Aug. 27, 2013, which designated the United States and has been published as International Publication No. WO 2014/169974 A1 and which claims the priority of European Patent Application, Serial No. 13164073.2, filed Apr. 17, 2013, pursuant to 35 U.S.C. 119(a)-(d).

BACKGROUND OF THE INVENTION

The present invention relates to an electrical machine,
wherein the electrical machine has a stator and a rotor arranged on a rotor shaft,
wherein the rotor shaft is rotatably supported in bearings, so that the rotor can be rotated about an axis of rotation,
wherein the stator extends over a stator region viewed in the direction of the axis of rotation,
wherein the rotor has a central region and outer regions adjacent to the central region on both sides, viewed in the direction of the axis of rotation.

An electrical machine of this type is generally known. In particular an electrical machine of this type is known, in which
the rotor bears a number of tangentially magnetized permanent magnets in respect of the axis of rotation, which are tangentially evenly distributed viewed around the axis of rotation,
wherein flux guiding elements are arranged tangentially between the permanent magnets viewed around the axis of rotation, by means of which flux guiding elements magnetic fields coming from the permanent magnets are directed radially toward the stator viewed in respect of the axis of rotation,
wherein the flux guiding elements consist of a plurality of sheets stacked one on the other viewed in the direction of the axis of rotation.

A relatively high power density can be achieved with electrical machines of the type described last.

SUMMARY OF THE INVENTION

The present invention is based on the object to create an electrical machine, in which the power density can be increased still further.

The object is achieved in accordance with the invention by an electrical machine which includes a stator and a rotor arranged on a rotor shaft,
wherein the rotor shaft is rotatably supported in bearings, so that the rotor can be rotated about an axis of rotation,
wherein the stator extends over a stator region viewed in the direction of the axis of rotation,
wherein the rotor has a central region and outer regions adjacent to the central region (7a) on both sides viewed in the direction of the axis of rotation,
wherein the central region corresponds to the stator region viewed in the direction of the axis of rotation,
wherein the permanent magnets are arranged both in the central region and also in the outer regions of the rotor viewed in the direction of the axis of rotation,
wherein the magnetic fields coming from the permanent magnets are directed into the central region by means of the flux guiding elements viewed in parallel to the axis of rotation,
wherein the sheets in the outer regions of the rotor are smaller than the sheets in the central region of the rotor,
wherein the sheets arranged in the outer regions of the rotor are surrounded externally by a holding device viewed radially in respect of the axis of rotation and
wherein the rotor has form-fitting elements, by means of which centrifugal forces acting on the sheets arranged in the central region of the rotor are transferred into the sheets arranged in the outer regions of the rotor.

Advantageous embodiments of the electrical machine form the subject matter of the dependent claims.

The form-fitting elements can be embodied as required. By way of example, the form-fitting elements can comprise local form-fitting elements which have been introduced into the sheets, by means of which centrifugal forces are transferred in each case between directly adjacent sheets. One possible embodiment of local form-fitting elements of this type are punch-bundled tappets which have been introduced into the sheets and herewith corresponding cutouts which have been introduced into the sheets.

Alternatively or in addition to the local form-fitting elements, the form-fitting elements can comprise rods, which, viewed in the direction of the axis of rotation, extend over the entire rotor and are guided through corresponding cutouts in the sheets.

If the rods are present, viewed radially in respect of the axis of rotation, they preferably have a larger extension than viewed tangentially in respect of the axis of rotation. Viewed in particular in a plane orthogonal to the axis of rotation, they can have a rectangular cross-section. In order to achieve as even a force distribution as possible, a first elastic intermediate layer is arranged between the rods and the sheets.

Alternatively or in addition to the first elastic intermediate layer, a second elastic intermediate layer can be arranged between the sheets and the permanent magnets.

Viewed radially in respect of the axis of rotation, the sheets preferably have internally an inner section and externally an outer section, wherein the inner sections are embodied in the manner of a circular sector viewed in a plane orthogonal to the axis of rotation, and the outer sections are embodied in the manner of a circular ring sector viewed in the plane orthogonal to the axis of rotation. It is particularly preferable in this case that viewed tangentially about the axis of rotation-, the inner sections cover an inner angle and outer sections cover an outer angle and the outer angle is greater than the inner angle.

The holding devices can in particular be embodied as annular sleeves or as pre-stressed bandages.

A stator winding system is usually arranged in the stator. The stator winding system has winding heads, which, viewed in the direction of the axis of rotation, project on both sides over the stator. The winding heads have a longitudinal extension viewed in the direction of the axis of rotation. The longitudinal extension of the winding heads preferably corresponds to a longitudinal extension of the outer regions of the rotor.

BRIEF DESCRIPTION OF THE DRAWINGS

The above-described properties, features and advantages of this invention as well as the manner in which they are achieved will become clearer and more clearly understood in conjunction with the following description of the exemplary embodiments, which are explained in more detail in conjunction with the drawings, in which, shown in a schematic representation:

FIGS. 1 and 2 show longitudinal sections through an electrical machine,

FIGS. 3 and 4 show cross-sections through the rotor of the electrical machine in FIGS. 1 and 2, FIG. 9 shows a longitudinal section through the rotor of an electrical machine.

DETAILED DESCRIPTION OF A PREFERRED EMBODIMENT

Figure 5:
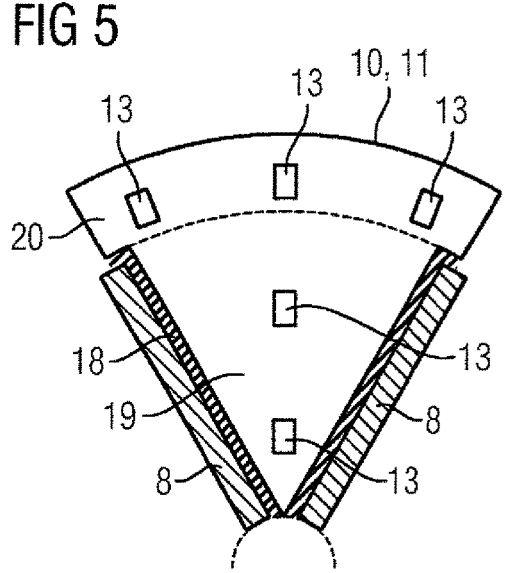
FIG. 5 shows one possible embodiment of a sheet.

According to FIGS. 1 to 4, an electrical machine has a stator 1 and a rotor 2. The rotor 2 is arranged on a rotor shaft 3. The rotor shaft 3 is supported rotatably in bearings 4. The rotor shaft 3 and with it the rotor 2 can as a result be rotated about an axis of rotation 5.

Provided that the terms "axial", "radial" and "tangential" are used below, they are always related to the axis of rotation 5. "Axial" is a direction parallel to the axis of rotation 5. "Radial" is a direction orthogonal in respect of the axis of rotation 5 toward the axis of rotation 5 or away therefrom. "Tangential" is a direction which is orthogonal both in respect of the axial direction and in respect of the radial direction. Tangential is therefore a direction which is directed in a circular manner about the axis of rotation 5 at a constant radial distance and with a constant axial position.

The stator 1 extends in the axial direction over a stator region 6. A stator winding system 1a is arranged in the stator 1. The stator winding system 1a has winding heads 1b, which viewed in the axial direction project on both sides over the stator 1. The winding heads 1b have a longitudinal extension 11 viewed in the axial direction.

The rotor 2 extends in the axial direction over a rotor region 7. The rotor region 7 has a central region 7a and outer regions 7b in the axial direction. The central region 7a corresponds, viewed in the axial direction, to the stator region 6. The outer regions 7b border the central region 7a on both sides in the axial direction. The central region 7a is therefore arranged between the two outer regions 7b. The outer regions 7b have a longitudinal extension 12. The longitudinal extension 12 of the outer regions 7b preferably corresponds to the longitudinal extension 11 of the winding heads 1b.

The rotor 2 bears a number of permanent magnets 8. The permanent magnets 8 are distributed evenly around the axis of rotation 5 in the tangential direction. They are, as indicated in FIGS. 3 and 4 by arrows 9, magnetized tangentially in respect of the axis of rotation 5. The permanent magnets 8 are (see FIG. 1), viewed in the axial direction, arranged both in the central region 7a and also in the outer regions 7b of the rotor 2. The number of permanent magnets 8 shown in FIGS. 3 and 4 is purely exemplary however.

According to FIGS. 3 and 4, flux guiding elements 10 are arranged between the permanent magnets 8 viewed in the tangential direction. Magnetic fields B coming from the permanent magnets 8 are directed toward the stator 1, viewed in the radial direction, by means of the flux guiding elements 10. Viewed in the axial direction, the magnetic fields B are directed into the central region 7a by means of the flux guiding elements 10.

The flux guiding elements 10 consist, viewed in the axial direction, of a plurality of sheets 11 stacked one on the other. The sheets 11 in the outer regions 7b of the rotor 2 are, as indicated on the one hand in FIG. 1 and on the other hand from a comparison of FIGS. 3 and 4 together, smaller than the sheets 11 in the central region 7a of the rotor 2. The sheets 11 arranged in the outer regions 7b of the rotor 2 are surrounded externally by a holding device 12 viewed in the radial direction. The holding devices 12 can be embodied for instance as annular, pre-stressed sleeves or as pre-stressed bandages.

The rotor 2 has form-fitting elements 13 to 16. By means of the form-fitting elements 13 to 16, centrifugal forces which act on the sheets 11 arranged in the central region 7a of the rotor 2 are transmitted into the sheets 11 arranged in the outer regions 7b of the rotor 2. Possible embodiments of the form-fitting elements 13 to 16 are explained in more detail below in connection with FIGS. 5 to 9.

Figure 6:
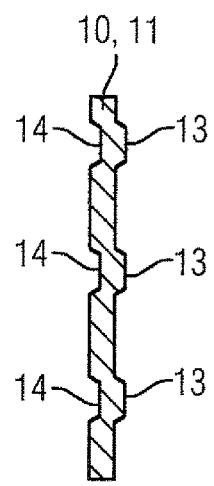
FIG. 6 shows a longitudinal section through two sheets.

According to FIGS. 5 and 6, the form-fitting elements 13 to 16 can comprise local form-fitting elements 13, 14 which have been introduced into the sheets 11. Centrifugal forces are transmitted in each case between directly adjacent sheets 11 by means of the local form-fitting elements 13, 14. In particular, the local form-fitting elements 13, 14 according to FIGS. 5 and 6 can be embodied as punch-bundled tappets 13 incorporated in the sheets 11 and herewith corresponding cutouts 14 which have been introduced into the sheets 11. The number and arrangement of the local form-fitting elements 13, 14 shown in FIGS. 5 and 6 is purely exemplary.

The local form-fitting elements 13, 14 were explained above in connection with sheets 11, which are arranged in the central region 7a of the rotor 2. The same embodiments are generally also realized in the sheets 11 which are arranged in the outer regions 7b of the rotor 2.

Figure 7:
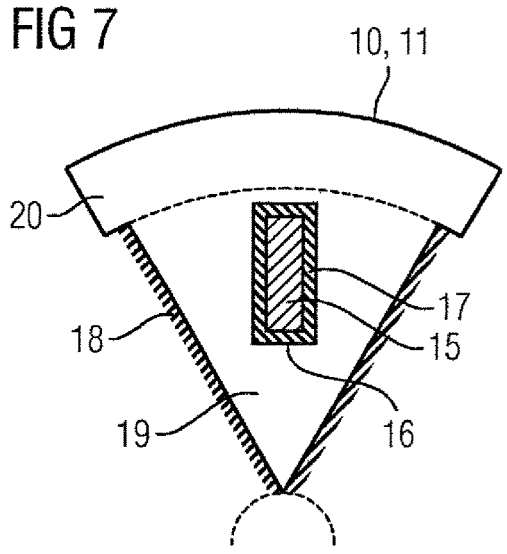
FIG. 7 shows a further possible embodiment of a sheet.
Figure 8:
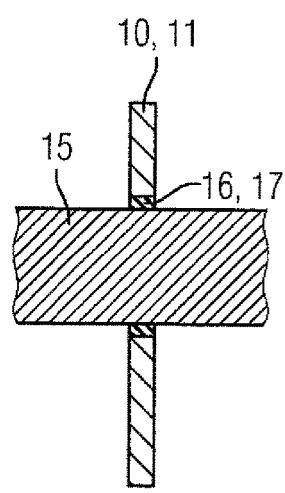
FIG. 8 shows a longitudinal section through a sheet and a rod.

According to FIGS. 7 to 9, globally acting form-fitting elements 15, 16 may also exist. In this case, the form-fitting elements 13 to 16 comprise rods 15 as globally acting form-fitting elements 15, 16. The rods 15 extend in the axial direction over the entire rotor 2. They are guided through corresponding cutouts 16 in the sheets 11.

The globally acting form-fitting elements 15, 16 are, according to FIGS. 7 to 9, present as an alternative to the local form-fitting elements 13, 14. It is nevertheless likewise possible to realize the embodiments in FIGS. 5 and 6 on the one hand and those in FIGS. 7 to 9 on the other hand.

The rods 15 can be embodied as round rods or as square rods. In this case, the rods 15 in the radial direction have the same extension as in the tangential direction. However, the rods 15 in the radial direction preferably have a larger extension than in the tangential direction. In particular, the rods 15 viewed in a radial-tangential plane can have a rectangular cross-section, wherein the larger side length of the rectangle is preferably oriented radially.

If the rods 15 and the cutouts 16 are present, an elastic intermediate layer 17 can be present between the rods 15 and the sheets 11 in order to balance out tolerances and equalize a contact pressure, said elastic intermediate layer 17 being referred to below as a first elastic intermediate layer 17. Irrespective of whether the rods 15 and the cutouts 16 are present, and irrespective of whether if necessary the first elastic intermediate layer 17 is present, a further elastic intermediate layer 18 can be present in accordance with FIGS. 5 and 7 between the sheets 11 and the permanent magnets 8, in order to differentiate between the first elastic intermediate layer 17 and the second elastic intermediate layer 18.

The sheets 11 have—see FIGS. 3, 4, 5 and 7—internally an inner section 19 and externally an outer section 20 in the radial direction. The inner sections 19 are embodied in the manner of a circular sector viewed in a radial-tangential plane. They cover an inner angle α in the tangential direction. The outer sections 20 are embodied in the manner of a circular ring sector in the radial-tangential plane. They cover an outer angle β in the tangential direction. The outer angle β is greater than the inner angle α.

The inventive electrical machine has a number of advantages. In particular, an electrical machine can be constructed, which has a rotor 2 excited by means of permanent magnets 8, in which the magnetic flux is concentrated both in the axial direction and also in the tangential direction. Nevertheless, a very small air gap can be realized between the rotor 2 and the stator 1, because a holding device is not required in the air gap between the rotor 2 and the stator 1, in other words in the central region 7a of the rotor 2.

Although the invention has been illustrated and described in detail by the preferred exemplary embodiment, the invention is not restricted by the disclosed examples and other variations can be derived herefrom by the person skilled in the art without departing from the scope of protection of the invention.

What is claimed is:

1. An electrical machine, comprising:
a stator;
a rotor mounted for rotation relative to the stator about an axis of rotation, said rotor having a central region and outer regions adjacent to both sides of the central region, when viewed in a direction of the axis of rotation, with the stator extending over a stator region, when viewed in the direction of the axis of rotation;
a plurality of permanent magnets on the rotor that are tangentially magnetized relative to the axis of rotation and tangentially evenly distributed in both the central region and outer regions of the rotor, when viewed in the direction of the axis of rotation, the magnets each having a radial length;
flux guiding elements arranged tangentially between the permanent magnets so that magnetic fields from the permanent magnets are directed radially toward the stator, and in parallel into the central region of the rotor, viewed in the direction of the axis of rotation, said flux guiding elements having a plurality of sheets stacked on one another, with sheets in the outer regions of the rotor being smaller than sheets in the central region of the rotor,
wherein the sheets include an internal inner section and an external outer section, when viewed radially in the direction of the axis of rotation, with the inner section forming a circular sector, when viewed in a direction of a plane orthogonal to the axis of rotation, and with the outer section forming a circular ring sector, when viewed in the direction of a plane orthogonal to the axis of rotation,
wherein the internal inner section covers an inner angle and the external outer section covers an outer angle, when viewed in a direction of a tangent of the axis of rotation, said outer angle being greater than said inner angle;
a holding device externally surrounding the sheets in the outer regions of the rotor, viewed radially in the direction of the axis of rotation;
form-fitting elements transferring centrifugal forces acting on the sheets in the central region of the rotor into the sheets arranged in the outer regions of the rotor; and
a second elastic intermediate layer extending across an entire sheet-facing surface area of the magnet on only the internal inner section, so as to extend the radial length of the magnet between the sheets and the permanent magnets.

2. The electrical machine of claim 1, wherein the form-fitting elements comprise local form-fitting elements among the sheets, said form-fitting elements being configured to transfer centrifugal forces between directly adjacent sheets.

3. The electrical machine of claim 2, wherein the local form-fitting elements comprise punch-bundled tappets introduced into the sheets, and cutouts introduced into the sheets, said cutouts corresponding to the tappets.

4. The electrical machine of claim 3, wherein the form-fitting elements comprise rods sized to extend over the rotor in its entirety, viewed in the direction of the axis of rotation, and guided through corresponding cutouts in the sheets.

5. The electrical machine of claim 4, wherein the rods have a larger extension when viewed radially in the direction of the axis of rotation than when viewed in a direction of a tangent of the axis of rotation.

6. The electrical machine of claim 4, wherein the rods have a rectangular cross-section when viewed in a direction of a plane orthogonal to the axis of rotation.

7. The electrical machine of claim 4, further comprising a first elastic intermediate layer between the rods and the sheets.

8. The electrical machine of claim 1, wherein the holding device is constructed in the form of an annular sleeve or pre-stressed bandage.

9. The electrical machine of claim 1, wherein the stator includes a stator winding system having winding heads projecting out from the stator on both sides, said winding heads having a longitudinal extension that corresponds to a longitudinal extension of the outer regions of the rotor, when viewed in the direction of the axis of rotation.

* * * * *